United States Patent [19]

Collins et al.

[11] Patent Number: 4,730,334
[45] Date of Patent: Mar. 8, 1988

[54] ULTRAVIOLET METAL ION LASER

[76] Inventors: George J. Collins, 807 W. Oak St., Fort Collins, Colo. 80521; John R. McNeil, 13423 Desert Hills NE., Albuquerque, N. Mex. 87111; Zeng-qi Yu, North Aggie Village, Apt. 7C, C.S.U., Ft. Collins, Colo. 80523

[21] Appl. No.: 475
[22] Filed: Jan. 5, 1987
[51] Int. Cl.⁴ .............................................. H01S 3/097
[52] U.S. Cl. ...................................... 372/88; 372/37; 372/76; 372/56
[58] Field of Search ....................... 378/56, 37, 88, 76; 372/61, 55, 74

[56] References Cited

U.S. PATENT DOCUMENTS 3,931,589  1/1976  Aisenberg et al. ................... 372/88
4,641,316  2/1987  Collins et al. ....................... 372/76

Primary Examiner—Leon Scott, Jr.
Attorney, Agent, or Firm—William E. Hein

[57] ABSTRACT

A gas ion laser employs a direct current electron beam to create a rare gas ion density and a cylindrical magnetron to sputter a partial pressure of metal vapor density and to also create a rare gas ion density. Thermal energy charge transfer selectively pumps the upper metal ion laser transitions on a continuous wave basis.

50 Claims, 13 Drawing Figures

ULTRAVIOLET METAL ION LASER

REFERENCE TO RELATED APPLICATION

This application is related to and incorporates by reference the subject matter of allowed U.S. Pat. application Ser. No. 656,408 entitled D.C. Electron Beam Method and Apparatus for Continuous Laser Excitation filed on October 1, 1984.

BACKGROUND OF THE INVENTION

This invention relates generally to metal ion lasers. An evaporation metal source and associated expensive and unreliable high temperature ovens used in some of these prior art electron beam pumped metal ion lasers have inhibited the commercial development of metal ion lasers employing high temperature ovens. For example, copper, silver, and gold require oven temperatures greater than 1000 degrees centigrade to obtain sufficient metal density for laser operation.

Metal ion lasers known in the prior art provide discrete output wavelengths in the 220-2000 nanometer spectral region on a continuous basis as described by D. Gerstenberger, R. Solanki, and G. Collins, *Hollow Cathode Metal Ion Lasers*, QE-16, No. 8 IEEE JOURNAL OF QUANTUM ELECTRONICS 820 (August, 1980). Prior designs of metal ion lasers generally fall into three categories. First, the ions from a rare gas discharge created in a capillary tube act together with metal vapor thermally generated by an external oven, or discharge heating to create laser action from metal ions. Secondly the ions created in a hollow cathode discharge react together with the metal vapor created by cathode sputtering in the same hollow cathode discharge to create laser action from metal ions. Thirdly, electron beam pumped metal ion lasers employing external ovens to create the required metal density have been demonstrated and reported by J. Rocca, J. Meyer, and G. Collins, *1-W cw Zn ion laser*, 43(1) APPL. PHYS. LETT. 37 (July 1, 1983).

Some disadvantages of these prior art metal ion lasers are as follows. The relatively low density of energetic electrons in the hollow cathode discharge and the low cathode lifetime (100 hours) in a hollow cathode discharge sputtering environment have been barriers to the practical development of prior art metal vapor ion lasers employing hollow cathodes. An evaporation metal source and associated expensive and unreliable high temperature ovens used in some of these prior art electron beam pumped metal ion lasers have inhibited the commercial development of metal ion lasers employing high temperature ovens. For example, copper, silver, and gold require oven temperatures greater than 1000 degrees centigrade to obtain sufficient metal density for laser operation.

SUMMARY OF THE INVENTION

The present invention uses a magnetron discharge to create metal vapor, which acts with electron beam created rare gas ions or with magnetron discharge created rare gas ions to efficiently produce laser action throughout the wide wavelength range from the infrared to ultraviolet. This is accomplished via thermal energy charge transfer reactions or via recombination to pump the upper levels of a metal ion laser.

The use of cylindrical cathode for magnetron sputtering is described below for purposes of illustration, but other geometries such as an enclosed rectangular waveguide are also possible. The life of the cathode undergoing sputtering is increased over that of prior art open hollow cathode structures by enclosing it in a cylindrical magnetron tube since such a tube is an efficient container of sputtered metal atoms. Beam electrons may be created in an abnormal glow discharge that is separate from the magnetron discharge. Beam electrons efficiently ionize rare gas ions and create rare gas metastable rare gas atoms via electron impact with rare gas atoms. Penning ionization and thermal energy charge transfer between metastable rare gas atoms and rare gas ions, respectively, with the metal atoms sputtered from the cathode subsequently create excited metal ions. The required metal vapor density for laser action is achievable in the cylindrical magnetron discharge via sputtering without the use of high temperature ovens as are required in the prior art metal ion lasers.

According to the present invention, one or more glow discharge created electron beams are focused into the cylindrical cathode magnetron tube used for magnetron sputtering of metal atoms to create additional rare gas ions from those created by the magnetron discharge itself. For example, two glow discharge created longitudinal electron beams are focused into the cyclindrical cathode magnetron tube from opposing ends by providing a concave shape for the front face of each of the two cold cathode electron guns employed. The associated concave electrostatic potential acts to focus the cold cathode generated electron beam. The radius of curvature of the front face of each of the cold cathodes is chosen consistent with the spacing between the front face and the opening in the cylindrical cathode magnetron. The fringe magnetic fields created by the use of a cylindrical magnetron solenoid external to the cylindrical cathode magnetron tube serve to increase the efficiency of propagation of the longitudinal electron beams into the cylindrical cathode magnetron tube. The longitudinal magnetic field created by the cylindrical magnetron solenoid lies within the cylindrical cathode magnetron region and acts to confine the longitudinal electron beam as it passes through the laser medium inside the cylindrical cathode magnetron tube. Since the magnetron discharge operates at one-tenth or less of the gas pressure of a hollow cathode discharge, it better allows for energetic beam electrons to penetrate the entire length of the laser medium. In other words, a lower gas density provides for a longer reaching distance for beam electrons of a specific energy. Therefore, the electron energy spectrum is more uniform along the longitudinal axis, and more uniform excitation of the upper laser level occurs along the longitudinal axis of the cylindrical cathode magnetron tube.

DESCRIPTION OF THE ILLUSTRATED EMBODIMENTS OF THE INVENTION

Figure 1:
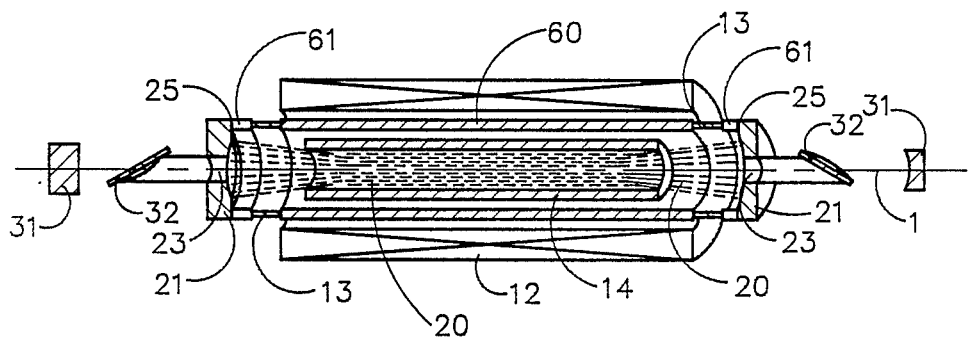
FIG. 1 is a cross-sectional representation of a metal ion laser constructed in accordance with the present invention.
Figure 2:
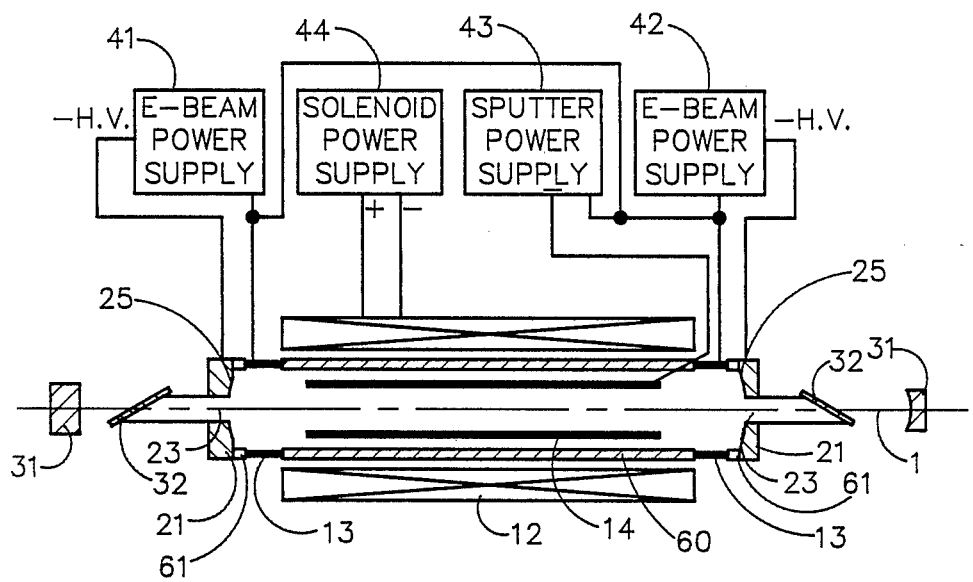
FIG. 2 illustrates the arrangement of power supply connections for the two electron guns, the magnetron sputtering discharge, and the solenoid employed in the metal ion laser of FIG. 1.
Figure 3A:
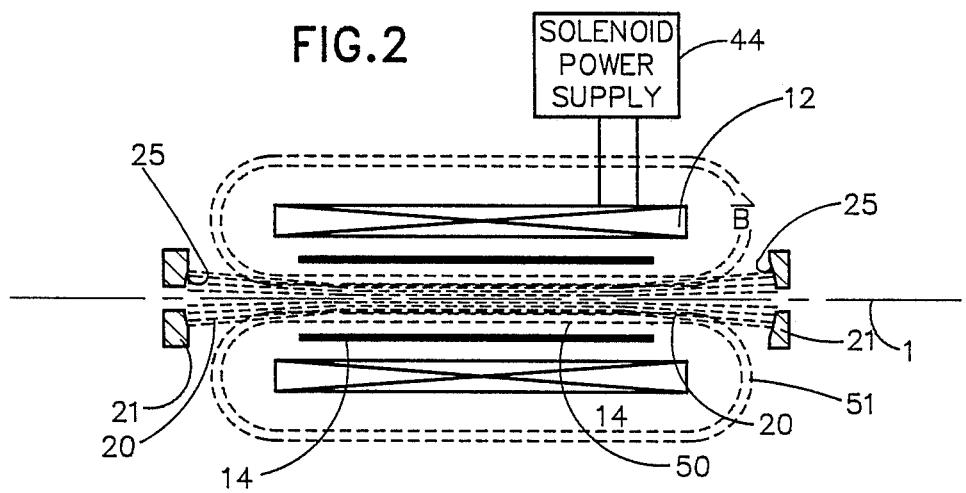
FIG. 3A illustrates the use of an electromagnet to create a longitudinal magnetic field for the cylindrical cathode magnetron tube employed in the metal ion laser of FIG. 1.

Referring now to FIGS. 1 and 2, there is shown a pictorial representation of metal ion laser constructed in accordance with the present invention that employs a cylindrical metal cathode tube 14 located on a longitudinal axi 1 of the metal ion laser. The cylindrical metal cathode tube 14 functions as the cathode for creating a cylindrical magnetron discharge and may be constructed of copper, gold, silver, cadmium, zinc, calcium, selenium, aluminum or strontium as well as other non-magnetic metals. This metal ion laser employs a pair of conventional Brewster windows 32 that function as part of a low loss optical cavity and also for vacuum sealing. A pair of annular shaped coaxial cold cathodes 21, each having an inner surface 25 chosen for efficiently emitting secondary electrons, is employed to create two counter propagating electron beams 20. The annular shaped coaxial cold cathodes 21 are located at the two ends of a cylindrical insulating vacuum chamber generally defined by cylindrical wall 60. Each of the annular shaped coaxial cold cathodes 21 includes an aperture 23 at the center thereof for providing an unobstructed optical path along the longitudinal axis 1 to a set of laser mirrors 31 located away from the Brewster windows 32. A coaxial solenoid 12 surrounds the cylindrical metal cathode tube 14 to create a desired magnetic field pattern such as that illustrated in FIG. 3A. A pair of coaxial electrodes 13 positioned between annular shaped cold cathodes 21 and vacuum chamber wall 60 form a common anode for creating both a magnetron discharge and an electron beam created discharge. A pair of insulating rings 61, each of which separates one of the coaxial electrodes 13 from an adjacent one of the annular shaped coaxial cold cathodes 21 are shown in FIGS. 1 and 2. The two counter propagating electron beams 20 are focused electrostatically into cylindrical metal cathode tube 14 and along the longitudinal axis 1 via a chosen shaping of inner surface 25 of the annular shaped cold cathodes 21. The spacing from each end of the solenoid 12 to the innersurface 25 of the adjacent one of the annular shaped coaxial cold cathodes 21 is chosen so as to optimize both electron beam generation from the annular shaped coaxial cold cathodes 21 and to optimize transmission of the counter propagating electron beams 20 into the cylindrical metal cathode tube 14. A fringe magnetic field 51 produced by either the solenoid 12 of FIG. 3A, a single element annular permanent magnet 15 of FIG. 3B, or a multi-element annular permanent magnet 16 of FIG. 3C also acts to focus the counter propagating electron beams 20 into the cylindrical metal tube 14, as illustrated in those figures. The solenoid 12 provides the required magnetic fields for both magnetron sputtering from the cylindrical metal cathode tube 14 and for focusing and confining the counter propagating electron beams 20 within the cylindrical cathode tube 14 and along the longitudinal axis 1. Power supply connections to the metal ion laser of FIG. 1 are illustrated in FIG. 2. A solenoid power supply 44 drives the solenoid 12 to create a longitudinal magnetic field 50 and a fringe magnetic field 51, as shown in FIG. 3A. The cylindrical metal cathode tube 14 is powered by a sputter power supply 43 for creating cathode sputtering via a magnetron discharge. A pair of electron beam power supplies 41 and 42 independently drive each of the annular shaped coaxial cold cathodes 21. The electrical potentials placed on the cylindrical metal cathode tube 14 and the two annular shaped coaxial cold cathodes 21 are controlled independently, though they share a common anode in coaxial electrodes 13.

Referring now to FIG. 3A, a solenoid 12 creates a longitudinal magnetic field 50 within the cylindrical metal cathode tube 14 along the longitudinal axis 1. The fringe magnetic field 51 produced by the solenoid 12 acts to focus the counter propagating electron beams 20 into the cylindrical metal cathode tube 14 and causes them to propagate along the longitudinal axis 1.

Figure 3B:
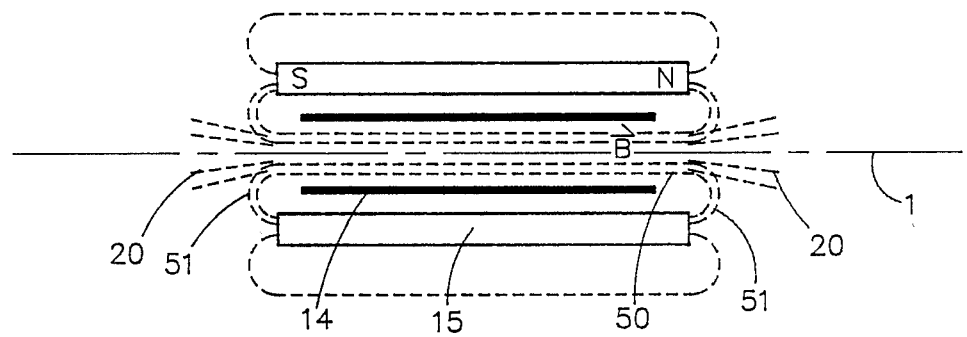
FIG. 3B illustrates the use of a single element permanent cylindrical magnet to create a longitudinal magnetic field for the cylindrical cathode magnetron tube employed in the metal ion laser of FIG. 1.

Referring now to FIG. 3B, a single element annular permanent magnet 15 is employed for the same purposes as the solenoid 12 of FIG. 3A.

Figure 3C:
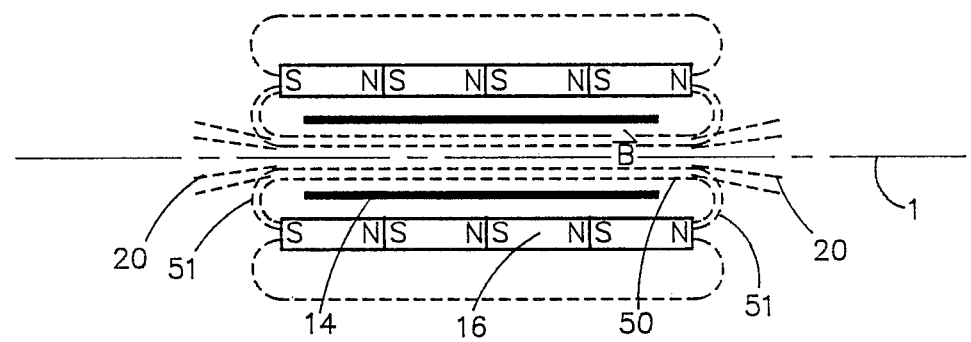
FIG. 3C illustrates the use of several permanent cylindrical magnets positioned in tandem to create a longitudinal magnetic field for the cylindrical cathode magnetron tube employed in the metal ion laser of FIG. 1.

Referring now to FIG. 3C, a multi-element annular permanent magnet 16 is employed for the same purpose as the solenoid 12 of FIG. 3A and the single element annular permanent magnet 15 of FIG. 3B.

Figure 4:
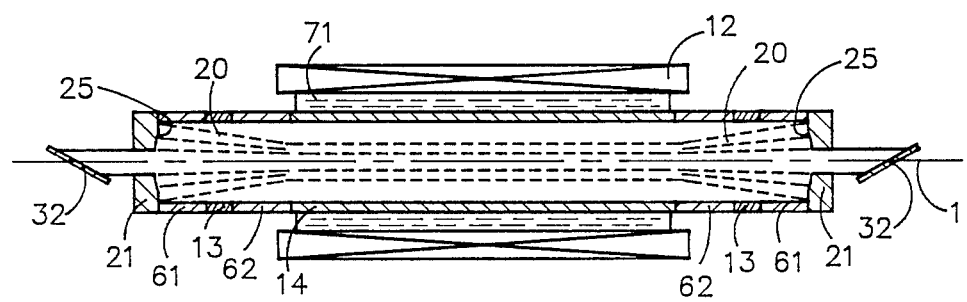
FIG. 4 illustrates how a cylindrical cathode magnetron tube employed in a metal ion laser can be used to function as both a sputter cathode and as a part of the vacuum wall and water cooling jacket wall.

Referring now to FIG. 4, the cylindrical metal cathode tube 14 and a pair of insulating spacers 61 and 62 form part of the vacuum chamber wall, thereby replacing the separate insulating vacuum chamber wall 60 of FIGS. 1 and 2. In this configuration an external cavity 71 can be used to cool both the cylindrical metal cathode tube 14 and the solenoid 12 of FIG. 3A, the single element annular permanent magnet 15 of FIG. 3B, or the multi-element annular permanent magnet of FIG. 3C. The use of the cylindrical metal cathode tube 14 as a portion of the vacuum chamber wall may apply to any of the optical cavity arrangements illustrated in FIGS. 1 and 6A-D.

Figure 5A:
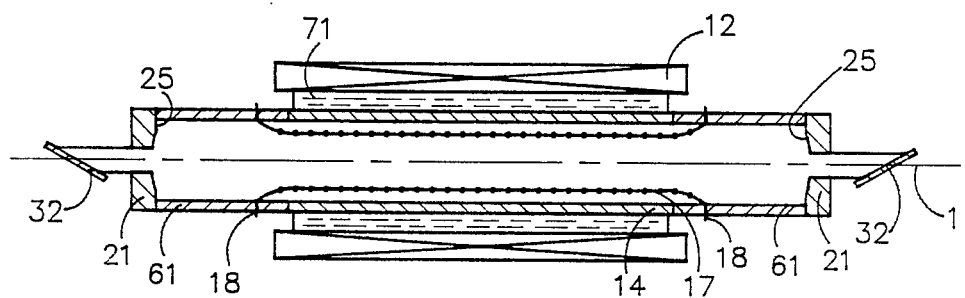
FIGS. 5A-B illustrate alternative anode designs for the cylindrical cathode magnetron tube employed in the metal ion laser of the present invention.
Figure 5B:
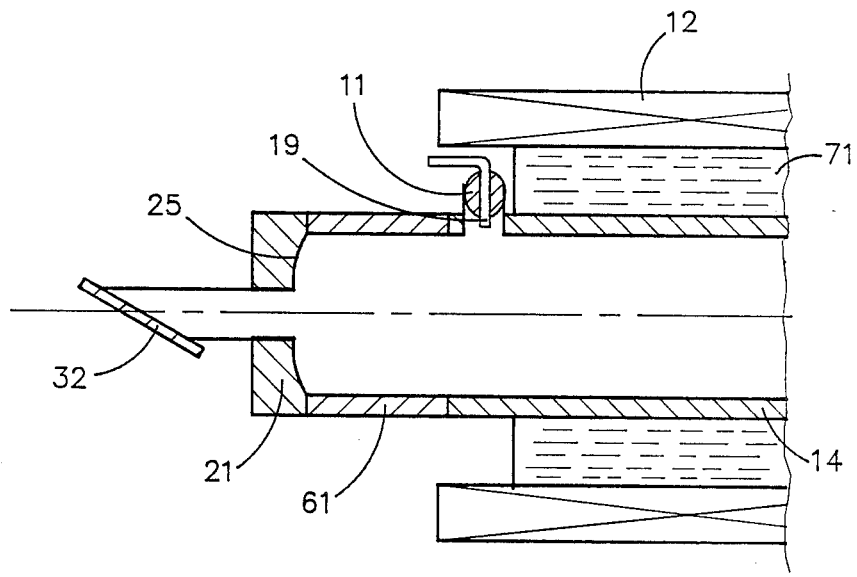

FIGS. 5A-B illustrate two alternative anode arrangements to that shown in FIGS. 1, 2, and 4. A mesh anode 17, as shown in FIG. 5A, extends along the cylindrical metal cathode tube 14, coaxial with the longitudinal axis 1. The mesh anode 17 is electrically connected to the anode terminal of the external power supplies 41 and 42 of FIG. 2 via conventional electrical feed throughs 18 located in the insulating spacers 61. Two pin anodes 19, as shown in FIG. 5B, are placed near the ends of the cylindrical metal cathode tube 14 via conventional pin feed throughs 11 located in the cylindrical metal cathode tube 14 or in the insulating spacers 61.

Figure 6A:
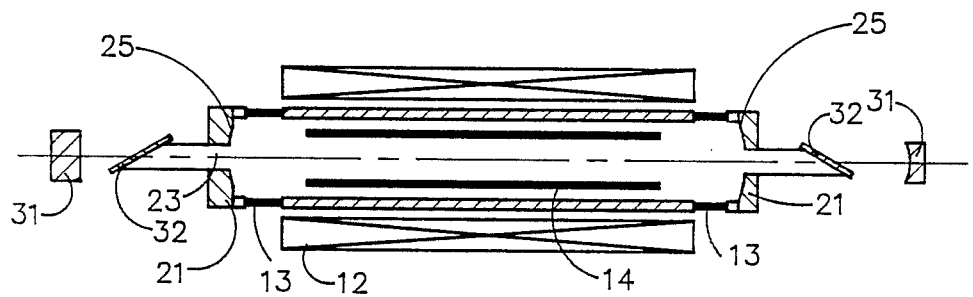
FIGS. 6A-D illustrate four configurations of mirrors, prisms, and Brewster windows that form the optical cavity in the metal ion laser of the present invention.
Figure 6B:
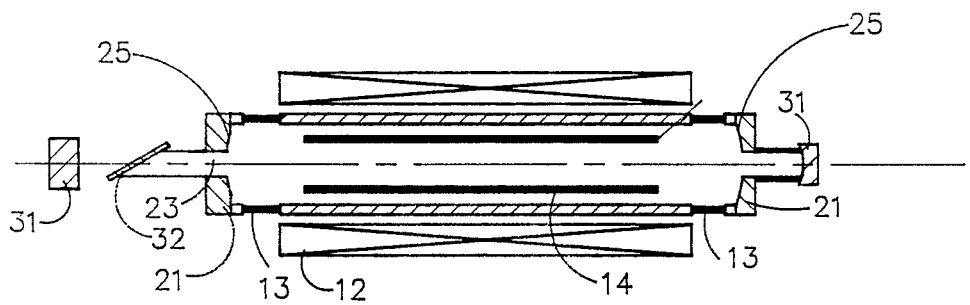
Figure 6C:
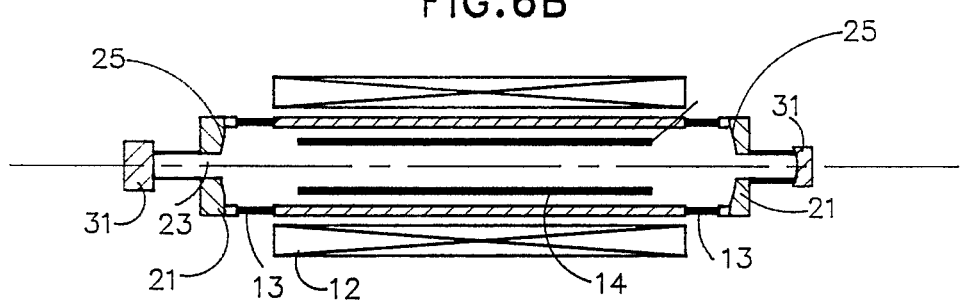
Figure 6D:
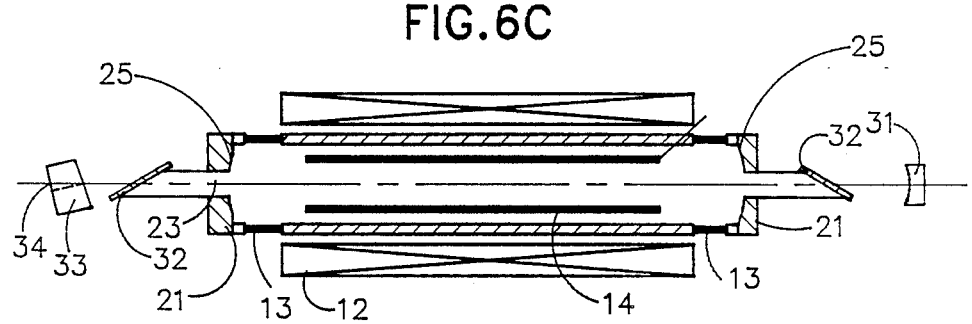

Referring now to FIGS. 6A-D, there are shown four alternative laser resonator and associated optics configurations. In FIG. 6A, these elements comprise a pair of Brewster angle windows 32 and two external mirrors 31. In FIG. 6B, these elements comprise an internal mirror 31 and a Brewster window 32 in combination with an external mirror 31. In FIG. 6C, these elements simply comprise two internal mirrors 31, thereby eliminating the need for a pair of Brewster windows. In FIG. 6D, these elements comprise an end mirror 31 in combination with a Brewster window 32 and a Littrow prism 33, also in combination with a Brewster window 32. Littrow prism 33 has a broadband optical coating on its outer surface 34 and is employed for wavelength tuning of the metal ion laser. End mirror 31 of FIG. 6D can be mounted internally as illustrated in FIG. 6C to thereby eliminate the need for an associated Brewster window 32.

Figure 7:
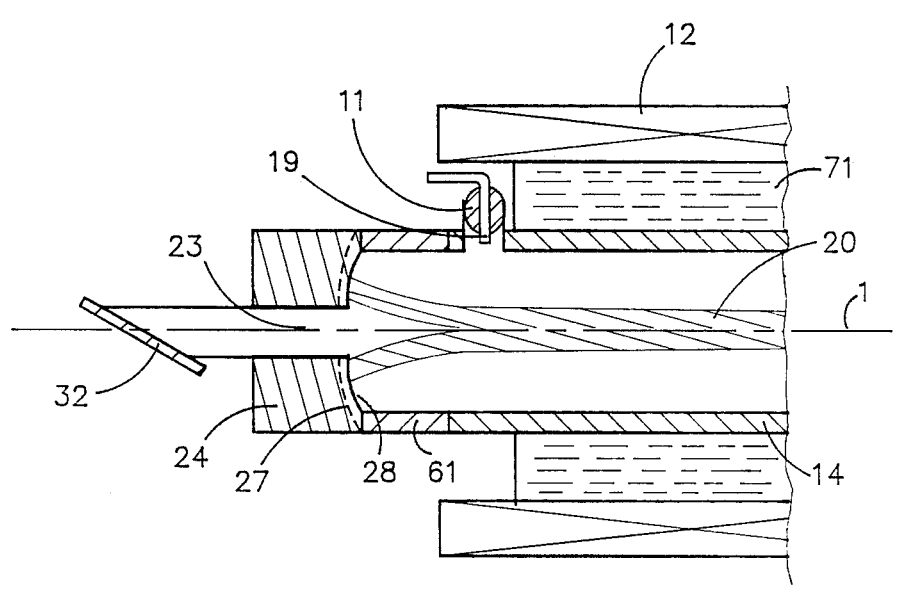
FIG. 7 illustrates an alternative electron source to the cold cathodes employed in the electron guns of the metal ion laser constructed in accordance with the present invention.

Referring now to FIG. 7, there is shown an electron beam source 24 that provides an alternate source of electron beam 20 to the annular shaped cold cathodes 21 illustrated in FIGS. 1-6D. Electron beam source 24 may comprise a thermionic cathode grid extraction electron source of annular shape with electric potentials modified to provide a beam of mono-energetic electrons. This source is described in detail by H. Kaufman and R. Robinson, *Broad-beam electron source*, 3 JOURNAL OF VACUUM SCIENCE TECHNOLOGY 1774 (No. 4, 1985). Alternatively, electron beam source 24 may comprise a cold cathode grid extraction electron source as described by T. Fusayama, *High Pressure Operation of an Electron Beam Gun*, 25 JAPANESE J. APPL. PHYS. (No. 5, May, 1986). In both the thermionic cathode grid extraction electron source and the cold cathode grid extraction electron source, two grids 27 and 28 are employed to extract an electron beam 20 from the chosen electron beam source 24. Those grids are preferably concave shaped to electrostatically focus the electron beam 20 into the cylindrical metal cathode tube 14. An aperture 23 is placed at the center of the electron beam source 24, including grids 27 and 28 to provide an unobstructed optical path along the longitudinal axis 1 of the metal ion laser. The function of the electron beam source 24 is similar to that of each of the annular shaped coaxial cold cathodes 21 of FIGS. 1-6D. However, the use of a thermionic cathode grid extraction electron source as electron beam source 24 of FIG. 7 permits operation of the metal ion laser at gas pressures 1000 times lower than those possible using the annular shaped coaxial cold cathodes 21 of FIGS. 1-6D. The use of a cold cathode grid extraction electron source as electron beam source 24 permits both higher pressure operation in helium as well as operation in other rare gas environments such as argon and neon. In contrast, a metal ion laser employing the annular shaped cold cathodes 21 of FIGS. 1-6D cannot operate effectively at helium pressures greater than 2 Torr and, more importantly, cannot operate in the heavier rare gases such as argon and neon. Both the thermionic cathode grid extraction and the cold cathode grid extraction electron sources are capable of maintaining a high beam current even when the beam voltage is reduced below one kilo-volt. This is an advantage over the annular shaped cold cathodes 21 of FIGS. 1-6D in which a reduction in beam voltage beyond one kilo-volt causes an undesired reduction in beam current.

We claim:

1. A metal ion laser comprising:
   a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;
   a cylindrical magnetron sputtering source positioned coaxially with an adjacent to said cylindrical vacuum enclosure, the cylindrical magnetron sputtering source including a cylindrical metal cathode tube positioned coaxially with and enclosed within said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the cylindrical magnetron sputtering source further including two cylindrical anodes each having a diameter substantially equal to the diameter of said cylindrical vacuum enclosure, one of the cylindrical anodes being positioned coaxially with the cylindrical vacuum enclosure at one end thereof, and the other one of the cylindrical anodes being positioned coaxially with the cylindrical vacuum enclosure at the other end thereof;
   two annular shaped cold cathodes each having diameter substantially equal to the diameter of the cylindrical vacuum enclosure and the two cylindrical anodes, each of said annular shaped cold cathodes having a central aperture therein and having a concave inner surface, said two annular shaped cold cathodes being positioned coaxially with and outside of the two cylindrical anodes such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and
   power supply means electrically connected to said metal ion laser for causing the cylindrical magnetron sputtering source to sputter metal vapor from the cylindrical metal cathode tube and for creating rare gas ions.

2. A metal ion laser as in claim 1 wherein said magnetic means comprises a cylindrical solenoid positioned coaxially with and surrounding said cylindrical vacuum enclosure.

3. A metal ion laser as in claim 1 wherein said magnetic means comprises a cylindrical permanent magnet positioned coaxially with and surrounding said cylindrical vacuum enclosure.

4. A metal ion laser as in claim 3 wherein said cylindrical permanent magnet comprises a plurality of cylindrical permanent magnet elements positioned coaxially with and surrounding said cylindrical vacuum enclosure.

5. A metal ion laser as in claim 1 wherein said cylindrical metal cathode tube is constructed of a material selected from the group consisting of copper, gold, silver, aluminum, strontium, calcium, zinc, cadmium, and selenium.

6. A metal ion laser as in claim 1 wherein the two annular shaped cold cathodes are constructed of aluminum with an oxide layer.

7. A metal ion laser comprising:

a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;

a cylindrical magnetron sputtering source positioned coaxially with and adjacent to said cylindrical vacuum enclosure, the cylindrical magnetron sputtering source including a cylindrical metal cathode tube positioned coaxially with and forming at least a portion of said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the magnetic means and said cylindrical vacuum enclosure forming an annular cavity through which a coolant is circulated, the cylindrical magnetron sputtering source further including two cylindrical anodes each having a diameter substantially equal to the diameter of said cylindrical vacuum enclosure, one of the cylindrical anodes being positioned coaxially with the cylindrical vacuum enclosure at one end thereof, and the other one of the cylindrical anodes being positioned coaxially with the cylindrical vacuum enclosure at the other end thereof;

two annular shaped cold cathodes each having a diameter substantially equal to the diameter of the cylindrical vacuum enclosure and the two cylindrical anodes, each of said annular shaped cold cathodes having a central aperture therein and having a concave inner surface, said two annular shaped cold cathodes being positioned coaxially with and outside of the two cylindrical anodes such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

8. A metal ion laser as in claim 7 wherein said magnetic means comprises a cylindrical solenoid positioned coaxially with and surrounding said cylindrical vacuum enclosure.

9. A metal ion laser as in claim 7 wherein said magnetic means comprises a cylindrical permanent magnet positioned coaxially with and surrounding said cylindrical vacuum enclosure.

10. A metal ion laser as in claim 9 wherein said cylindrical permanent magnet comprises a plurality of cylindrical permanent magnet elements positioned coaxially with and surrounding said cylindrical vacuum enclosure.

11. A metal ion laser as in claim 7 wherein said cylindrical metal cathode tube is constructed of a material selected from the group consisting of copper, gold, silver, aluminum, strontium, calcium, zinc, cadmium, and selenium.

12. A metal ion laser as in claim 7 wherein the two annular shaped cold cathodes are constructed of aluminum with an oxide layer.

13. A metal ion laser comprising:

a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;

a cylindrical magnetron sputtering source positioned coaxially with and adjacent to said cylindrical vacuum enclosure the cylindrical magnetron sputtering source including a cylindrical metal cathode tube positioned coaxially with and forming at least a portion of said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the magnetic means and said cylindrical vacuum enclosure forming a cavity through which a coolant is circulated, the cylindrical magnetron sputtering source further including a cylindrical mesh anode having a length approximately equal to that of said cylindrical metal cathode tube and positioned coaxially with and inside said cylindrical metal cathode tube;

two annular shaped cold cathodes each having a diameter substantially equal to the diameter of the cylindrical vacuum enclosure, each of said annular shaped cold cathodes having a central aperture therein and having a concave inner surface, said two annular shaped cold cathodes being positioned coaxially with and at opposite ends of said cylindrical vacuum enclosure such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

14. A metal ion laser as in claim 13 wherein said magnetic means comprises a cylindrical solenoid positioned coaxially with and surrounding said cylindrical vacuum enclosure.

15. A metal ion laser as in claim 13 wherein said magnetic means comprises a cylindrical permanent magnet positioned coaxially with and surrounding said cylindrical vacuum enclosure.

16. A metal ion laser as in claim 15 wherein said cylindrical permanent magnet comprises a plurality of cylindrical permanent magnet elements positioned coaxially with and surrounding said cylindrical vacuum enclosure.

17. A metal ion laser as in claim 13 wherein said cylindrical metal cathode tube is constructed of a material selected from the group consisting of copper, gold, silver, aluminum, strontium, calcium, zinc, cadmium, and selenium.

18. A metal ion laser as in claim 13 wherein the two annular shaped cold cathodes are constructed of aluminum with an oxide layer.

19. A metal ion laser comprising:
a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;
a cylindrical magnetron sputtering source positioned coaxially with and adjacent to said cylindrical vacuum enclosure, the cylindrical magnetron sputtering source including a cylindrical metal cathode tube positioned coaxially with and forming at least a portion of said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the magnetic means and said cylindrical vacuum enclosure forming a cavity through which a coolant is circulated, the cylindrical magnetron sputtering source further including a pair of pin anodes, one of which is positioned proximate to one end of said cylindrical metal cathode tube and the other of which is positioned proximate to the other end of said cylindrical metal cathode tube;
two annular shaped cold cathodes each having a diameter substantially equal to the diameter of the cylindrical vacuum enclosure, each of said annular shaped cold cathodes having a central aperture therein and having a concave inner surface, said two annular shaped cold cathodes being positioned coaxially with and at opposite ends of said cylindrical vacuum enclosure such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and
power supply means electrically connected to said metal ion laser for causing the cylindrical magnetron sputtering source to sputter metal vapor from the cylindrical metal cathode tube and for creating rare gas ions.

20. A metal ion laser as in claim 19 wherein said magnetic means comprises a cylindrical solenoid positioned coaxially with and surrounding said cylindrical vacuum enclosure.

21. A metal ion laser as in claim 19 wherein said magnetic means comprises a cylindrical permanent magnet positioned coaxially with and surrounding said cylindrical vacuum enclosure.

22. A metal ion laser as in claim 21 wherein said cylindrical permanent magnet comprises plurality of cylindrical permanent magnet elements positioned coaxially with and surrounding said cylindrical vacuum enclosure.

23. A metal ion laser as in claim 19 wherein said cylindrical metal cathode tube is constructed of a material selected from the group consisting of copper, gold, silver, aluminum, strontium, calcium, zinc, cadmium, and selenium.

24. A metal ion laser as in claim 19 wherein the two annular shaped cold cathodes are constructed of aluminum with an oxide layer.

25. A metal ion laser comprising:
a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;
a cylindrical magnetron sputtering source positioned coaxially with and adjacent to said cylindrical vacuum enclosure, the cylindrical magnetron sputtering source including a cylindrical metal cathode tube positioned coaxially with and forming at least a portion of said cylindrical vacuum enclosure, the cylindrical magnetron sputtering sourc further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the magnetic means and said cylindrical vacuum enclosure forming a cavity through which a coolant is circulated, the cylindrical magnetron sputtering source further including anode means positioned proximate each end of said cylindrical metal cathode tube;
two annular electron sources each having a diameter substantially equal to the diameter of the cylindrical metal cathode tube, each of said annular electron sources having a pair of concave grids forming an inner surface thereof and having a central aperture therein, said two annular electron sources being positioned coaxially with and proximate opposite ends of said cylindrical metal cathode tube such that the inner surface of one of the annular electron sources faces the inner surface of the other one of the annular electron sources and such that the aperture in each of the annular electron sources is in substantial alignment with said longitudinal optical axis, said two annular electron sources being operative for emitting counter propagating electron beams focused into said cylindrical metal cathode tube by said inner surface of each of said annular electron sources and said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

26. A metal ion laser as in claim 25 wherein said magnetic means comprises a cylindrical solenoid positioned coaxially with and surrounding said cylindrical vacuum enclosure.

27. A metal ion laser as in claim 25 wherein said magnetic means comprises a cylindrical permanent magnet positioned coaxially with and surrounding said cylindrical vacuum enclosure.

28. A metal ion laser as in claim 27 wherein said cylindrical permanent magnet comprises a plurality of cylindrical permanent magnet elements positioned coaxially with and surrounding said cylindrical vacuum enclosure.

29. A metal ion laser as in claim 25 wherein said two annular electron sources comprise two annular thermionic cathode grid extraction electron sources.

30. A metal ion laser as in claim 25 wherein said two annular electron sources comprise two annular cold cathode grid extraction electron sources.

31. A metal ion laser as in claim 25 wherein said cylindrical metal cathode tube is constructed of a material selected from the group consisting of copper, gold, silver, aluminum, strontium, calcium, zinc, cadmium, and selenium.

32. A metal ion laser comprising:
a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;

a cylindrical magnetron sputtering source positioned coaxially with and adjacent to said cylindrical vacuum enclosure, the cylindrical magnetron sputtering source including cylindrical metal cathode tube positioned coaxially with and enclosed within said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the cylindrical magnetron sputtering source further including a cylindrical mesh anode having a length approximately equal to that of said cylindrical metal cathode tube and positioned coaxially with and inside said cylindrical metal cathode tube;

two annular shaped cold cathodes each having a diameter substantially equal to the diameter of the cylindrical vacuum enclosure, each of said annular shaped cold cathodes having a central aperture therein and having a concave inner surface, said two annular shaped cold cathodes being positioned coaxially with and at opposite ends of said cylindrical vacuum enclosure such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

33. A metal ion laser as in claim 32 wherein said magnetic means comprises a cylindrical solenoid positioned coaxially with and surrounding said cylindrical vacuum enclosure.

34. A metal ion laser as in claim 32 wherein said magnetic means comprises a cylindrical permanent magnet positioned coaxially with and surrounding said cylindrical vacuum enclosure.

35. A metal ion laser as in claim 34 wherein said cylindrical permanent magnet comprises a plurality of cylindrical permanent magnet elements positioned coaxially with and surrounding said cylindrical vacuum enclosure.

36. A metal ion laser as in claim 32 wherein said cylindrical metal cathode tube is constructed of a material selected from the group consisting of copper, gold, silver, aluminum, strontium, calcium, zinc, cadmium, and selenium.

37. A metal ion laser as in claim 32 wherein the two annular shaped cold cathodes are constructed of aluminum with an oxide layer.

38. A metal ion laser comprising:
a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;

a cylindrical magnetron sputtering source positioned coaxially with and adjacent to said cylindrical vacuum enclosure, the cylindrical magnetron sputtering source including a cylindrical metal cathode tube positioned coaxially with and enclosed within said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the cylindrical magnetron sputtering source further including a pair of pin anodes, one of which is positioned proximate to one end of said cylindrical metal cathode tube and the other of which is positioned proximate to the other end of said cylindrical metal cathode tube;

two annular shaped cold cathodes each having a diameter substantially equal to the diameter of the cylindrical vacuum enclosure, each of said annular shaped cold cathodes having a central aperture therein and having a concave inner surface, said two annular shaped cold cathodes being positioned coaxially with and at opposite ends of said cylindrical vacuum enclosure such that the concave inner surface of one of the annular shaped cold cathodes faces the concave inner surface of the other annular shaped cold cathode and such that the aperture in each of the annular shaped cold cathodes is in substantial alignment with said longitudinal optical axis, said two annular shaped cold cathodes being operative for emitting counter propagating electron beams focused into said cylindrical metal cathode tube by said concave inner surface of each of said annular shaped cold cathodes and by said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

39. A metal ion laser as in claim 38 wherein said magnetic means comprises a cylindrical solenoid positioned coaxially with and surrounding said cylindrical vacuum enclosure.

40. A metal ion laser as in claim 38 wherein said magnetic means comprises a cylindrical permanent magnet positioned coaxially with and surrounding said cylindrical vacuum enclosure.

41. A metal ion laser as in claim 40 wherein said cylindrical permanent magnet comprises a plurality of cylindrical permanent magnet elements positioned coaxially with and surrounding said cylindrical vacuum enclosure.

42. A metal ion laser as in claim 38 wherein said cylindrical metal cathode tube is constructed of a material selected from the group consisting of copper, gold, silver, aluminum, strontium, calcium, zinc, cadmium, and selenium.

43. A metal ion laser as in claim 38 wherein the two annular shaped cold cathodes are constructed of aluminum with an oxide layer.

44. A metal ion laser comprising:

a cylindrical vacuum enclosure having a longitudinal axis that is coincident with an unobstructed longitudinal optical axis defined by a resonant optical cavity comprising two mirrors, one at each end thereof, one or both of which mirrors are employed to extract power from the laser;

a cylindrical magnetron sputtering source positioned coaxially with and adjacent to said cylindrical vacuum enclosure, the cylindrical magnetron sputtering source including a cylindrical metal cathode tube positioned coaxially with and enclosed within said cylindrical vacuum enclosure, the cylindrical magnetron sputtering source further including magnetic means positioned outside said cylindrical vacuum enclosure for providing a longitudinal magnetic field parallel to the longitudinal optical axis and within said cylindrical metal cathode tube and for additionally providing fringe magnetic fields at the ends of said cylindrical metal cathode tube, the cylindrical magnetron sputtering source further including anode means positioned proximate each end of said cylindrical vacuum enclosure;

two annular electron sources each having a diameter substantially equal to the diameter of the cylindrical vacuum enclosure, each of said annular electron sources having a pair of concave grids forming an inner surface thereof and having a central aperture therein, said two annular electron sources being positioned coaxially with and proximate opposite ends of said cylindrical metal cathode tube such that the inner surface of one of the annular electron sources faces the inner surface of the other one of the annular electron sources and such that the aperture in each of the annular electron sources is in substantial alignment with said longitudinal optical axis, said two annular electron sources being operative for emitting counter propagating electron beams focused into said cylindrical metal cathode tube by said inner surface of each of said annular electron sources and said fringe magnetic fields and being confined within said cylindrical metal cathode tube by said longitudinal magnetic field; and power supply means electrically connected to said metal ion laser for causing the cylindrical magnetron sputtering source to sputter metal vapor from the cylindrical metal cathode tube and for creating rare gas ions.

45. A metal ion laser as in claim 44 wherein said magnetic means comprises a cylindrical solenoid positioned coaxially with and surrounding said cylindrical vacuum enclosure.

46. A metal ion laser as in claim 44 wherein said magnetic means comprises a cylindrical permanent magnet positioned coaxially with and surrounding said cylindrical vacuum enclosure.

47. A metal ion laser as in claim 46 wherein said cylindrical permanent magnet comprises a plurality of cylindrical permanent magnet elements positioned coaxially with and surrounding said cylindrical vacuum enclosure.

48. A metal ion laser as in claim 44 wherein said two annular electron sources comprise two annular thermionic cathode grid extraction electron sources.

49. A metal ion laser as in claim 44 wherein said two annular electron sources comprise two annular cold cathode grid extraction electron sources.

50. A metal ion laser as in claim 44 wherein said cylindrical metal cathode tube is constructed of a material selected from the group consisting of copper, gold, silver, aluminum, strontium, calcium, zinc, cadmium, and selenium.

* * * * *